United States Patent [19]
Crafton

[11] 3,985,998
[45] Oct. 12, 1976

[54] PERSONAL AUTHORITY VERIFICATION SYSTEM

[75] Inventor: Paul A. Crafton, Potomac, Md.

[73] Assignee: Century International Corporation, Rockville, Md.

[22] Filed: Aug. 17, 1973

[21] Appl. No.: 389,086

Related U.S. Application Data

[63] Continuation-in-part of Ser. No. 90,756, Nov. 18, 1970, abandoned.

[52] U.S. Cl. .................. 235/61.7 B; 340/149 A
[51] Int. Cl.² .................. G06K 5/00; G07F 7/02
[58] Field of Search ............ 235/61.7 B; 340/149 A

[56] References Cited
UNITED STATES PATENTS

| | | | |
|---|---|---|---|
| 3,394,246 | 7/1968 | Goldman | 235/61.7 B |
| 3,401,830 | 9/1968 | Mathews | 235/61.7 B |
| 3,562,494 | 2/1971 | Schmidt | 235/61.11 E |
| 3,593,291 | 7/1971 | Carter | 235/61.7 B |
| 3,602,695 | 8/1971 | Boss | 235/61.7 B |

*Primary Examiner*—Daryl W. Cook

[57] ABSTRACT

An authority verification system for verifying the authority of the user of a credit or other account by assigning a different code name to each account. When an account is used, the code name, in enciphered form is written on a certificate along with other information necessary to debit the credit account. Verification apparatus deciphers the code name and compares it with the code name assigned to the account being debited.

In addition, when the credit or other account is either a checking account or charge account, other enciphered codes may be included on each check and credit card to protect against alteration of the check or credit card and thus assure check or credit card authenticity.

20 Claims, 10 Drawing Figures

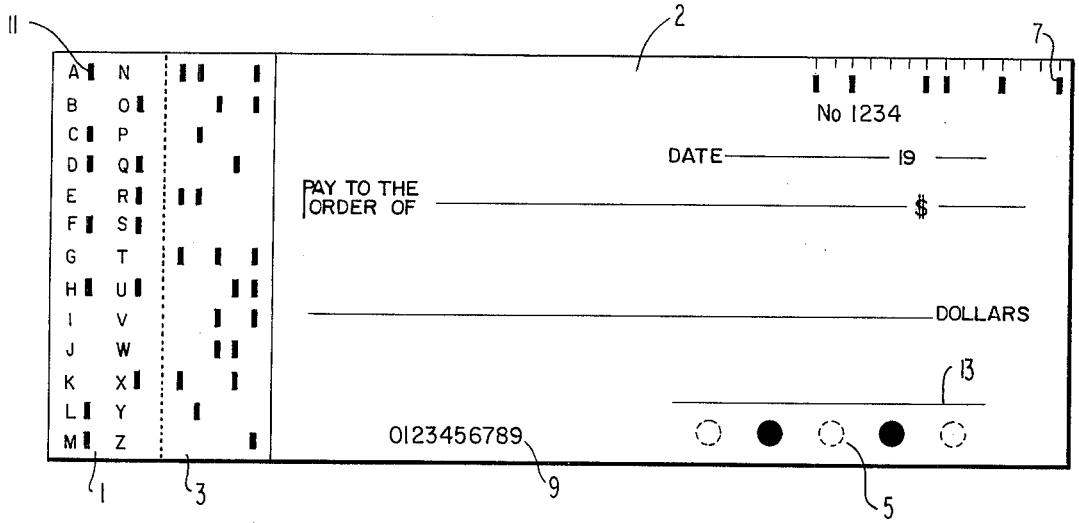
FIG.1
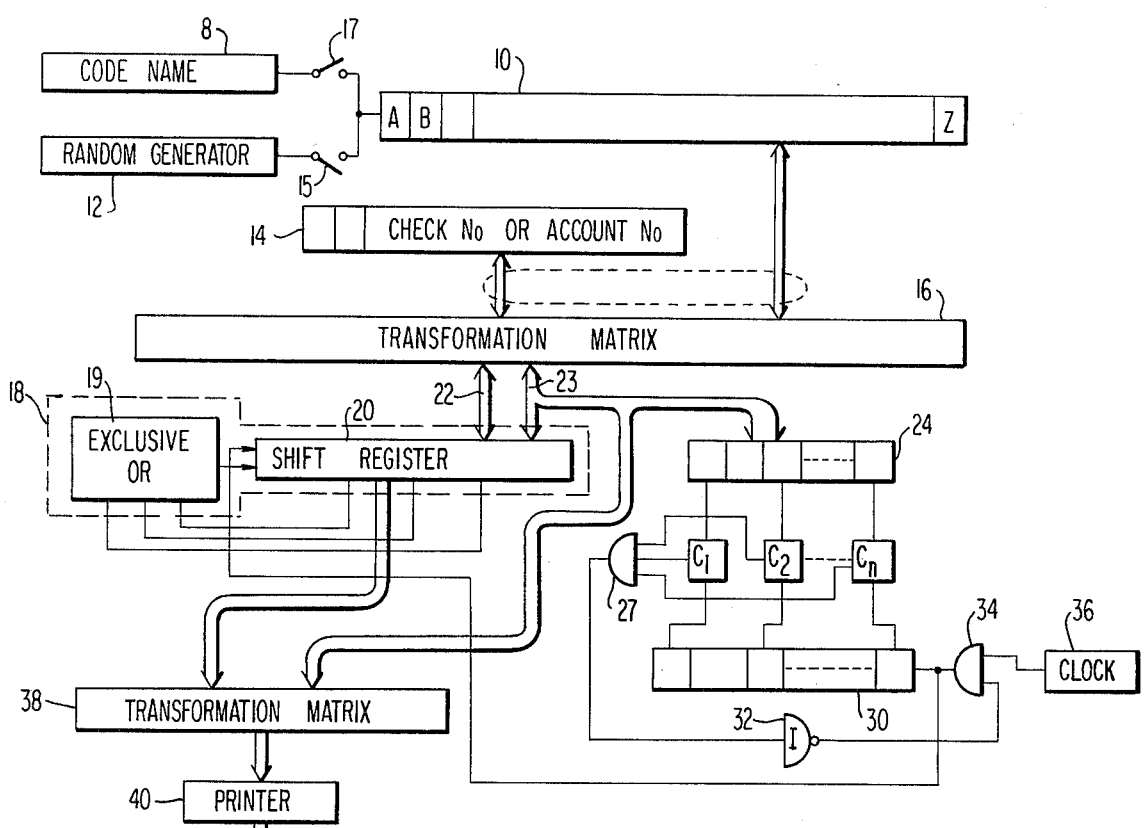
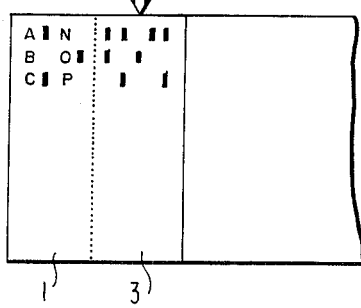
FIG.2
INVENTOR
PAUL CRAFTON
BY Sughrue, Rothwell, Mion, Zinn & Macpeak
ATTORNEYS

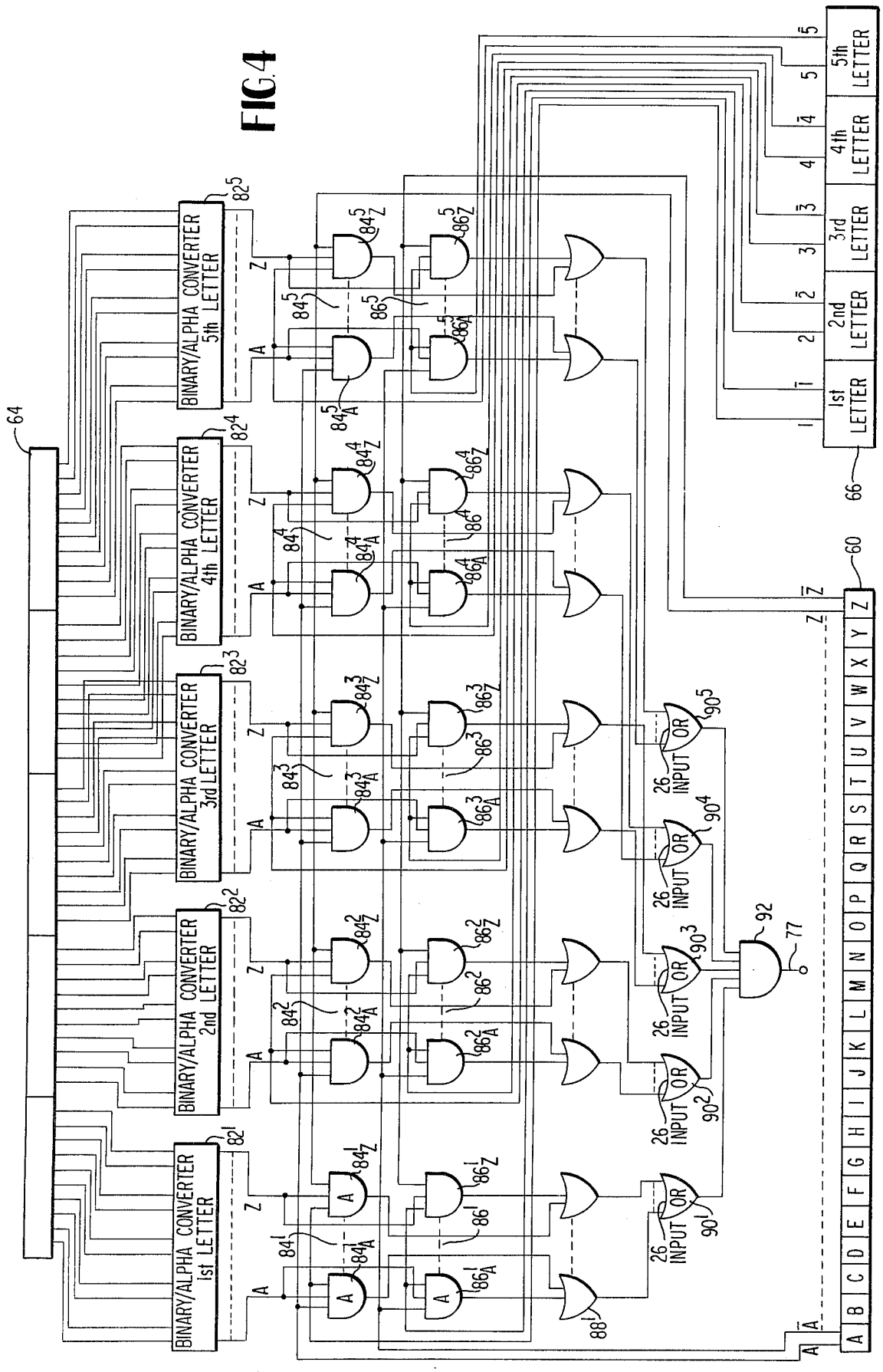

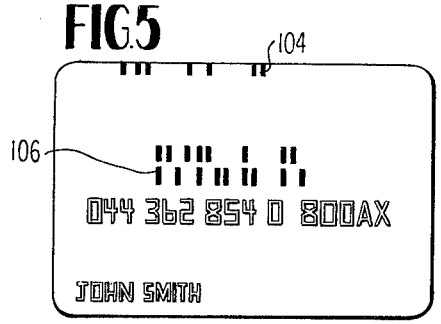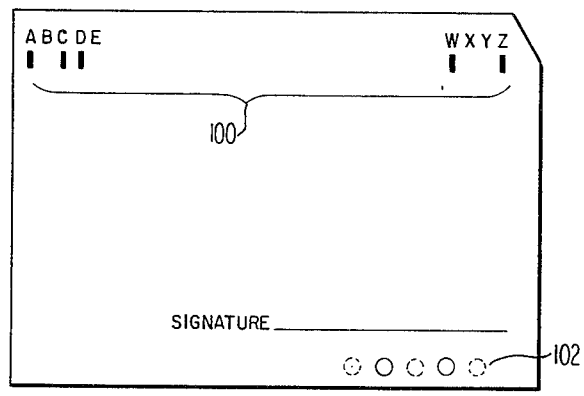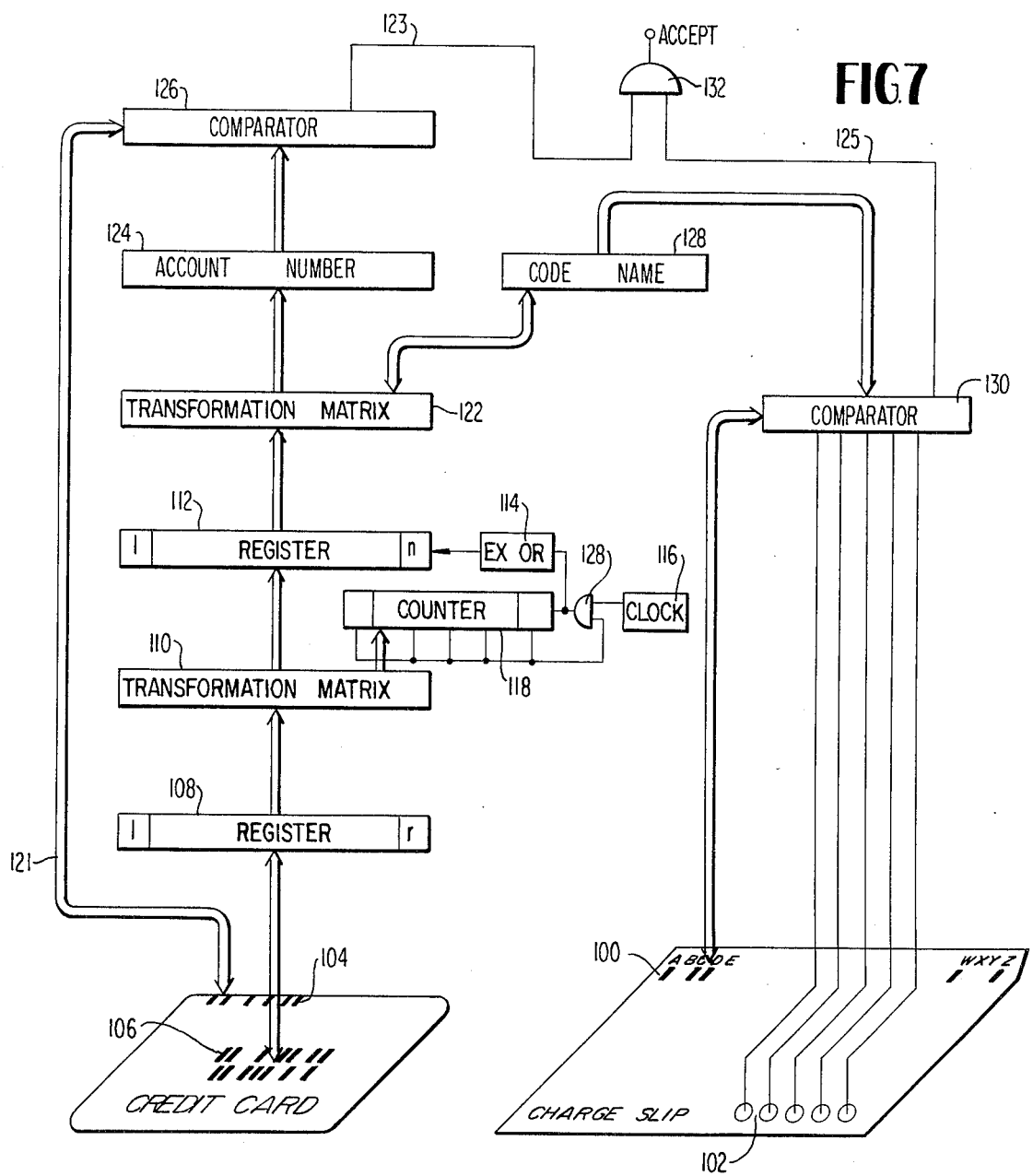

A B C D E F G H I J K L M N O P Q R S T U V W X Y Z
+   + +     +   ± | + + +       +      +    +
          150

FOR VALUE RECEIVED,........hereby sells, assigns and transfers unto

Please insert social security number or other
    identifying number of assignee ..............................................
                (Please Type Name and Address)

Please insert alphanumeric
coded private name of assignee  ..............................................

152
..............................................
the within certificate and all rights and interests represented thereby, and does
hereby irrevocably constitute and appoint ................................................................attorney
to transfer the said certificate on the books of the within-named Corporation, with
full power of substitution in the premises.

Date.................................

..........................(L.S.)

In the presence of

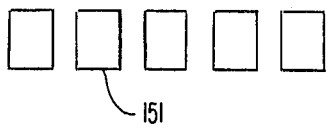
                                            151

FIG. 10

PERSONAL AUTHORITY VERIFICATION SYSTEM

CROSS-REFERENCE TO RELATED APPLICATION

This application is a continuation-in-part of the application of Paul A. Crafton, Ser. No. 90,756, filed Nov. 18, 1970, for "Personal Verification System", now abandoned.

BACKGROUND OF THE INVENTION

The invention is in the field of verifying the authority of the user of a credit account.

In the modern highly commercialized and highly technological world, countless everyday business transactions are consummated with the aid of credit accounts such as checking and charge accounts. Use of an account is evidenced by the user executing a certificate in the form of a promise to pay a specified amount. The unauthorized use of such certificates has become a major problem in the business world. To protect against such unauthorized use various method have been devised to verify the authority of the user of a credit account.

Where checks are involved, the authenticity of the maker's signature can be verified by comparing the signature on the check against the authorized signature. However, due to the extremely large volume of checks presented for payment each day, a check by check signature comparison is impossible.

In the case of credit cards, an attempt is often made to verify the identify of the credit card user by requiring him to submit additional proof of his identity. For example, a person is often required to present his driver's license, social security card or other form of identification, before a store will accept his credit card. However, the unauthorized use of credit cards often results from the loss or theft of an authorized user's wallet or handbag so that the additional forms of identification also fall into the hands of the thief. Thus, these methods of authority verification fall far short of solving the problem.

Therefore, a system must be developed which can verify a user's authority without relying on his personal signature or his identification papers. Further, the system should operate such that the credit card user or the maker of a check need not operate any devices. This requirement is particularly important in veryifying the authority of a maker of a check, since the verification procedure occurs when the payee or his endorser presents the check for payment at a bank. In addition, by not requiring the user to operate any devices, less chance of error in the verification process occurs.

SUMMARY OF THE INVENTION

The system of this invention solves the authority identification problem. Each account in the form of a checking account or charge account, for example, has assigned to it a code name known only to an authorized person. When that person uses the checking or charge account, he marks the check or charge slip with a code signature which is his code name in enciphered form. The code name is enciphared through the use of a randomly generated alphabet display wherein there is associated with each letter of the alphabet a randomly generated mark or space. Thus, the user simply marks designated areas on the check or slip with a mark or space as dictated by his code name and the alphabet display. Since a different alphabet display appears on each check bland or charge slip it is impossible to determine the code name from the code signature without using the alphabet display.

To verify the user's authority, the code signature is electronically decoded to retrieve the code name. The code name is then electronically compared with the code name assigned to the account number. By enciphering the code name, individuals who might receive the check or charge slip cannot determine the code name for the particular account.

Depending upon the particular type of certificate of promise to pay, other codes of authenticity are enciphered and then decoded at the time of verification. This further assures against the fraudulent use of check blanks or cerdit cards. For example, in the case of check blanks, the other codes of authenticity may include the check number which is also imprinted on the check blank in deciphered form. In the case of a credit card the other codes of authenticity may include the account number which is also imprinted on the credit card in deciphered form. This insures against alteration of the check number or account number by unauthorized users.

BRIEF DESCRIPTION OF THE DRAWINGS

FIG. 1 illustrates the format of a check incorporating the teachings of this invention.

FIG. 2 illustrates enciphering apparatus applicable to either check or credit card verification systems.

FIG. 4 is a detailed illustration of the comparator 62 of FIG. 3.

FIG. 5 illustrates the general format for a credit card incorporating the teachings of this invention.

FIG. 6 illustrates the general format for a charge slip incorporating the teachings of this invention.

FIG. 7 illustrates a user verification system for verifying the authority of a credit card user.

FIG. 10 illustrates the format that may be used on the reverse side of a stock certificate or on a separate stock power form according to the teachings of the invention.

DETAILED DESCRIPTION OF THE PREFERRED EMBODIMENT

Figure 3:
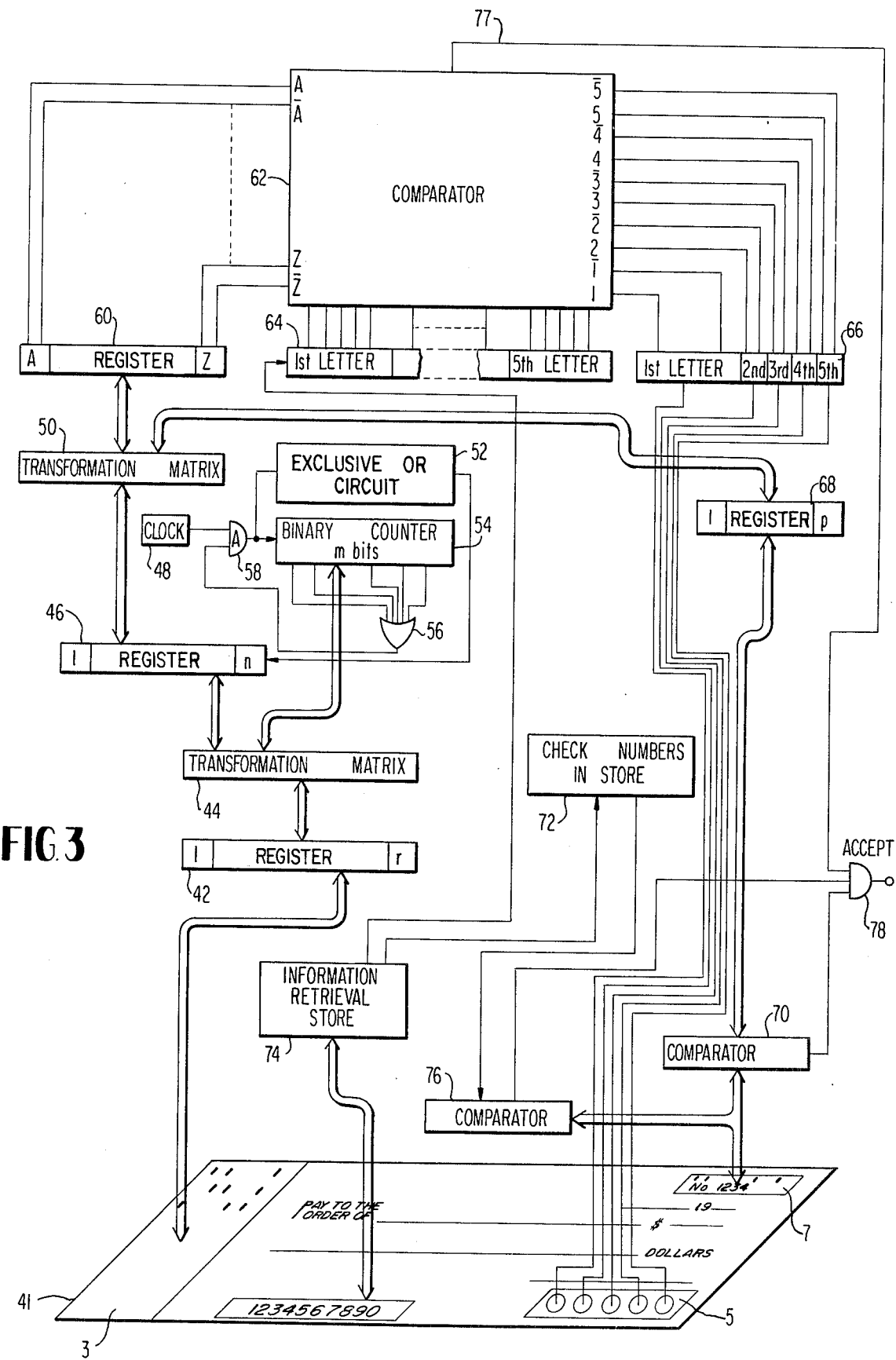
FIG. 3 illustrates a user verification system for use in verifying the authority of a maker of a check.

In order to verify the authority of the user of a credit or other account, each account is assigned a code name. Each time the credit or other account is used, a code signature which is the code name in enciphered form is added to the check, charge slip or other commercial document or certificate. In addition, other codes of authenticity are enciphered on the check blank, credit card or other commerical document or certificate to further assure against unauthorized use of the account. Since the enciphered codes of authenticity and authority may vary with different types of accounts, the description which follows treats several possible applications of the present invention. However, it is understood by those skilled in the art that the general teachings of the invention apply to other types of accounts and commercial documents or certificates.

The vertification system as it applies to checking accounts will be discussed first. FIG. 1 illustrates the general format for a check blank utilizing the teachings of this invention. Section 1 of the check blank forms a portion of the check stub. This section contains an alphabet display of randomly generated marks and spaces. The check blank illustrated in FIG. 1 has associated with the letter A a mark 11 while the letter B is identified by a space. Each check blank has a different randomly generated alphabet display.

Section 3 of the check blank contains an encipherment of the alphabet dislay of section 1 and the check number which also appears in deciphered form in section 2. The means for generating this encipherment is explained in detail below. The check number appears in section 2 in both numeric and binary form 7. The binary coded check number is imprinted on the check such that it is machine readable. For example, the marks which comprise the binary coded check number may be made with magnetic ink. In addition to the check number, section 2 contains a marking area 5 for receiving the code signature as well as a numeric display of the account number 9. The account number may also be displayed in binary form.

Use of the check blank may best be understood by way of example. Let it be assumed that the code name "table" has been given to the checking account identified by the number 0123456789. An authorized user of this check blank, after signing his normal signature along the manual signature line 13, marks the respective spaces of the code signature marking area 5 by referring to the alphabet display. The alphabet display associated with check number 1234 indicates that the letter T is designated by a space, the letter A by a mark, the letter B by a space, the letter L by a mark and the letter E by a space. Thus, the second and fourth marking spaces in the code signature marking area 5 are marked. It is of course understood that the invention is not limited to a five letter code name and such is given merely by way of example.

FIG. 2 illustrates a system for forming the enciphered portion 3 of the check blank of FIG. 1. As will be disclosed below the same enciphering system can be used with a credit card or other verification system.

When used to form enciphered section 3 on check blanks, switch 15 is closed, connecting random number generator 12 to the alphabet display 10. The alphabet display 10 may take the form of a 26 stage shift register, each stage representing a different letter of the alphabet. The check number shift register 14 is sequentially loaded with check numbers written in binary form. The contents of register 10 is randomly varied each time register 14 is incremented.

The operation of the enciphering system of FIG. 2 will now be described. The check number in register 14 and the alphabet display in register 10 are interleaved and transferred to transformation matrix 16. The contents of the transformation matrix 16 are transferred by way of busses 22 and 23 to shift register 20. Shift register 20. Shift register 20 forms a portion of pseudorandom sequence generator 18. Such generators are known in the art and are generally comprised of a shift register and an exclusive OR circuit 19. Inputs to circuit 19 are derived from selected stages of the register 20. The output of the exclusive OR circuit 19 is coupled to the data input terminal of the first stage of the register 20. Thus, each time the register shifts, the input to the first stage varies in accordance with the states of the selected stages.

Several randomly selected outputs from the transformation matrix 16 are, in addition to being coupled to the register 20, coupled to a register 24. To further intermix the data bits from registers 10 and 14 a binary counter 30 is set to zero. The counter has a number of stages equal to the number of stages in register 24. Each of the stages in the register 24 and counter 30 is coupled to a corresponding comparator $C_1 \ldots C_n$. The outputs of the comparators are coupled to AND gate 27 whose output is coupled through inverter 32 to AND gate 34.

Clock 36 increments the count in counter 30 until the count in counter 30 corresponds to the count represented by the states of the stages in register 24. When this occurs each output from the comparators $C_1 \ldots C_n$ is raised to a logic "1" thus causing the output of gate 27 to attain a logic "1". Inverter 32 causes a logic "0" to be presented to gate 34 thereby disabling this gate. Disabling of gate 34 not only prevents further incrementing of counter 30 but blocks further shifting in register 20.

The contents of shift register 20 as well as the selected outputs from transformation matrix 16 are interleaved and parallel loaded into the transformation matrix 38. The output signals from transformation matrix 38 are used to drive printer 40 which prints an array of marks and spaces on the check blank, the array being the encipherment of the check number and its corresponding alphabet display providing thereby codes of authenticity and authority, respectively.

After the encipherment has been printed, the counter 14 is incremented to store the next check number. Simultaneously, random generator 12 is activated to enter a new random number into the alphabet display register 10 and a new check blank placed under printer 40. The enciphering process described above is again carried out.

When the check is presented for payment at a bank or when it passes through a clearinghouse, the maker's authority is automatically verified. In addition, the account is checked to see if it contains sufficient funds to cover the check and further the check number is compared against checks previously paid on this account to determine whether or not a previous check bearing the same number has been paid.

The system for accomplishing this vertification is illustrated in FIG. 3. The encoded information on the check, including the encipherment in section 3, the code signature 5 and the check number 7 is read from the check by any known means. The particular means used depends upon the technique used for forming the encoded data on the check. For example, if magnetic ink is used then sensors responsive to such ink would be used. However, other known marking techniques may be used. In such other cases appropriate sensors are used to convert the markings into electrical signals. These are well-known in the art and do not form a portion of this invention.

The portion of the verification system of FIG. 3 for deciphering the encipherment in section 3 of the check will now be explained.

The encipherment is read as previously explained and loaded into shift register 42. The outputs of register 42 are parallel loaded into a transformation matrix 44. This matrix is identical to transformation matrix 38. The outputs of transformation matrix 44 which correpond to the selected outputs carried by bus 23 in FIG. 3 are parallel loading into binary counter 54 so as to introduce an initial count therein. The remaining outputs from the transformation matrix 44 are parallel loaded into shift register 46. Register 46 has the same number of stages as register 20. Binary counter 54 is a reversible counter. Clock 48 is activated to clock the counter 54 backwards until a zero count is reached. Each clock pulse which enters counter 54 also drives the pseudo-random sequence generator comprising an exclusive OR circuit 52 and register 46 such that the contents of shift register 46 is shifted backwards a number of shifts equal to the initial count in the binary counter 54. Gate 56 represents an m input OR gate. With any count other than zero in binary counter 54 the output of gate 56 is at a logic "1" thus enabling AND gate 58. When a zero count is reached, the output of gate 56 goes to a logic "0" thus disabling AND gate 58. In this manner further clock pulses are blocked from reaching the input to generator 52 thereby blocking further shifting of the contents of register 56. In this manner the contents of register 56 is shifted such that when the counter reaches its zero count the contents of register 46 matches the contents of register 20 when it was loaded from transformation matrix 16.

Each stage of register 46 is coupled to an input of transformation matrix 50. Matrix 50 corresponds to matrix 16. Thus, the outputs from matrix 50 are the interleaved bits of the alphabet display and the check number. The outputs from matrix 50 are coupled to registers 60 and 68 in a manner identical to the interconnection between registers 10 and 14 and matrix 16. In this manner the alphabet display and check number are deciphered with the alphabet display being stored in register 60 and the check number in registor 68.

The account number is read from the check as previously described and the bank's information retrieval store 74 searched to ascertain whether the account has sufficient funds to pay the check and also to obtain the code name corresponding to the account number. The code name stored in binary coded form is fed to register 64. When a five letter code name is used, register 64 is a 25 stage register, with each letter of the code name having five stages associated therewith. The code signature on the check is read and loaded into the code signature shift register 66.

To protect the holder of the checking account from having one of his cancelled checks copied verbatim by a forger, the check number is read and compared with all checks that have already been paid by this account. These check numbers are stored in the information retrieval store 74 and on command transferred to temporary storage means 72. The check numbers are then sequentially entered into comparator 76 which compares the check number with the number of the check being verified. A logic "1" output is generated by comparator 76 if the check number of the check being verified does not appear in the store 72.

To further protect the account from unauthorized use, the deciphered check number, stored in register 68, is compared in comparator 70 with the check number 7 on the check being verified. Such a comparison is necessary to prevent a forger from duplicating a cancelled check and designating it with an extremely high check number such that the chances of having that number stored in store 72 is practically nil.

The operation of comparator 70 is such that if a comparison exits it exhibits a logic "1" output. The outputs from comparator 70 and 76 are presented as inputs to AND gate 78. AND gate 78 indicates authenticity of the check with a logic "1" output. Such an output results if all of the inputs to the gate 78 are logic "1's". Thus, a signal indicating authenticity will result if the check number on the check agrees with the deciphered check number in register 68, the check number does not correspond to any of the checks previously paid by this account and if the output from comparator 62 on line 77 presents a logic "1".

The operation of comparator 62 will now be described. The comparator has three sets of inputs. A first set is derived from the alphabet display register 60. A second set corresponds to the code signature stored in register 66. A third set of inputs results from the output of the code name register 64. The code signature is decoded using the alphabet display contained in register 60. The decoded code signature is then compared with the code name in register 64 and if they compare a logic "1" appears on output line 77.

The details of comparator 62 and its operation will now be described with reference to FIG. 4. Like elements in FIGS. 3 and 4 are designated by common numerals. Thus, register 60 in FIG. 4 corresponds to the alphabet display register 60 in FIG. 3. In operation, the code name for the account under consideration in binary form is stored in register 64. As previously indicated for a five letter code name register 64 is a 25 stage register with five stages being associated with each of the five letters in the code name. Each of the five groups of stages has associated therewith a binary to alpha $82^1 \ldots 82^5$. Such converters are well-known in the art. There are 26 outputs from each of the binary to alpha converters corresponding to each of the 26 letters of the alphabet. Each of the binary/alpha converters has associated therewith two groups of 26 AND gates each $84^1 \ldots 84^5$ and $86^1 \ldots 86^5$. Each of the AND gates in groups 84 and 86 correspond to a different letter. Thus, AND gate $84^1_A$ corresponds to the letter A output from converter $82^1$ while gate $84^1_Z$ corresponds to the letter Z output from converter $82^1$. Similarly, gate $86^1_A$ corresponds to the letter A output from converter $82^1_Z$ corresponds to the letter Z output.

The output from the set side of each stage of the 26 stage alphabet display register 60 forms one input to its corresponding AND gate in group $84^1 \ldots 84^5$. Thus, the first stage of register 60 which corresponds to the letter A has its set side output designated A coupled to gate $84^1_A$. The third input to gate $84^1_A$ is connected to the set side of the stage in register 66 corresponding to the first letter in the code signature. The set side of the stage corresponding to the first letter of the code signature is also coupled to one input of each gate $84^1_B \ldots 84^1_Z$.

The reset side of the A stage of alphabet display register 60 designated by the letter $\overline{A}$ is coupled to one input of $86^1_A$. A second input to this gate is coupled to the output line in the binary to alpha converter $82^1$ corresponding to the letter A. The third input is coupled to the output of the reset side of the stage of the code signature register 66 corresponding to the first letter of the code signature.

In addition, the set side of the A stage of register 60 is coupled to an input of AND gates $84^2_A$, $84^3_A$, $84^4_A$ and $84^5_A$. A second input to each of these gates is coupled to the A line from its corresponding binary to alpha converter.

The set side of the stage corresponding to the first letter in register 66 is coupled to each of the AND gates in the group of gates $84^1$. The set side of the stage of register 66 corresponding to the second letter is coupled to each of the gates in group $84^2$. In a similar manner the set sides of each of the remaining stages of register 66 are coupled to their corresponding gate groups $84^3$, $84^4$ and $84^5$.

The reset side of the A stage of register 60 is, in addition to being coupled to gate $86^1_A$, coupled to each of the gates $86^2_A$, $86^3_A$, $86^4_A$, and $86^5_A$. The reset side of each of the other stages in register 60 is coupled to its corresponding gate in groups $86^1 \ldots 86^5$.

The reset side of each of the stages of register 66 is coupled to the gates in its corresponding gate group $86^1$ through $86^5$. Thus, the reset side of the second stage of register 66 is coupled to all of the gates in group $86^2$ while the reset side of the third stage is coupled to all of the gates in group $86^3$.

The operation of the comparator will now be described. Let it be assumed that the first letter of the code name is the letter A. In this case, line A of binary to alpha converter $82^1$ is raised to a logic "1". Let it be assumed that for a particular alphabet display the letter A has been designated by a mark. Therefore, a second input to AND gate $84^1_A$ is also raised to a logic "1". If a mark appeared in the first marking space of the code signature then the set side of the first stage of register 66 is also raised to a logic "1" thereby enabling gate $84^1$ thus raising to a logic "1" its output and the output of OR gate $88^1$.

A similar analysis shows that if for the particular alphabet display under consideration, the letter A was designated by a space and if a space appeared in the marking space of the code signature area 5 corresponding to the first letter of the code signature, the output of gate $86^1_A$ raises to a logic "1" thereby also raising the output of OR gate 88.

If correspondence exists between the first letter in register 66 and the actual first letter of the code name as indicated by the output of binary alpha converter $82^1$ at least one of the AND gates in group $84^1$ or $86^1$ will be enabled thus raising to a logic "1" the output of OR gate $90^1$. In a similar manner, correspondence between the other letters of the code name and the code signature raises to logic "1's" the outputs of gates $90^2$ through $90^5$. The outputs from gates $90^2 \ldots 90^5$ constitute the five inputs to AND gate 92. Only when all five inputs are raised to logic "1's" will a logic "1" appear on the output gate 92. Although it is possible to have for example the output OR gate $90^1$ raised to a logic "1" with the first marking space in the code signature marking area 5 arbitrarily marked, the probability of enabling gate 92 by arbitrarily marking all the code signature marking spaces is extremely remote.

The output from gate 92 is coupled by line 77 to gate 78. As previously indicated a correspondence between the imprinted check number and the check number stored in register 68 as well as a lack of correspondence between the check numbers previously paid for the account and the check number imprinted on the check raises two of the three inputs to gate 78. If the output of gate 92 is also raised to a logic "1" then the output of gate 78 raises to a logic "1" thereby signaling that the check should be accepted as authentic.

Thus the system of this invention provides means for verifying the authority of the maker and authenticity of a check submitted for payment at a bank or clearinghouse. The system of the invention allows authentication without having the maker of the check present. In addition to determining that the code signature on the check is authentic the system of the invention also verifies that the check number has not been altered and further that the check has not been previously paid.

A system based upon the same principles may be used to verify the authority of the user of a credit card. FIG. 5 illustrates the general form of a credit card which may be used with the system of this invention. In addition to containing the account number in numeric form the card may contain the account number in binary coded form as shown at 104. Further, as with the check verification system, an encipherment appears on the credit card. This encipherment is shown at 106. In the case of a credit card verification system this encipherment contains the code name of the lawful holder as well as the number of the charge account.

FIG. 6 illustrates the general format for a charge slip which the holder of the credit card fills out on making a purchase. A randomly generated alphabet display 100 is formed on each charge slip. The display, in the form of marks and spaces, is formed on the charge slip in such a manner as to be machine readable. In addition to having a place for manual signature there is a designated marking area 102 for accepting the code signature. When a person makes a purchase, in addition to signing along the manual signature line, he fills in the marking area 102 with his code name in coded form using the alphabet display 100.

In a manner to be explained, the system will permit user identification through an entirely local system. That is, there is no need to resort to a central processing unit when using the credit card verification system of this invention. All of the verifying codes are completely contained on the credit card itself. In that the codes are in enciphered form, an unauthorized party in possession of the credit card is unable to forge the charge slip without detection.

Encipherment 106 contains an encipherment of the code name as well as the account number. Upon decipherment the code name is compared with the code signature deciphered in accordance with the alphabet display on the charge slip. Were this the only code enciphered on the credit card it would be possible for a person having a legitimate charge account to forge another person's card. On the forged card he would simply replace his own account number with the victim's account number but use his own code name encipherment for which he obviously knows the code name. To remedy this adverse situation the encipherment also contains the account number. Upon decipherment, the account number is compared with the account number on the card and the decoded signature with the deciphered code name. If correspondence exists the user's authority has been verified.

With known apparatus the entire encipherment along with the card holder's name, address and account number in numeric and binary form can be printed on a charge slip. At the billing office the encipherment can again be deciphered and the account number contained in the encipherment billed regardless of the account number on the card.

Referring again to FIG. 2 the enciphering system previously described can be utilized to encipher the code name and account number of a charge account. When used with credit cards, switch 17 would be closed and register 10 loaded with the code name. In addition, register 14 is loaded with the corresponding account number in binary form. The outputs of registers 10 and 14 are interleaved and pass through transformation matrix 16 to the shift register 20 with selected output also being applied to register 24. The operation of this system is identical to the encipherment of check blanks and therefore need not be described again.

FIG. 7 illustrates a system for locally verifying the identity of a credit card user. The verifier may be packaged in a convenient form and placed next to the cashier in stores authorized to accept credit cards. After a customer has completed the charge slip, the credit card and charge slip are placed in appropriate slots of the verifier. The encipherment 106 is machine read and stored in register 108. The outputs of 108 are passed through transformation matrix 110. As with the decipherment of the encipherment on check blanks, the outputs of the selected stages in transformation matrix 110 are coupled to counter 118 with the outputs of the remaining stages coupled to register 112. Matrix 110 corresponds to matrix 38 while matrix 122 corresponds to matrix 16. The selected outputs cause an initial count to be stored in counter 118. Clock 116 causes binary counter 118 to count backwards to zero. Each clock pulse from clock 116 which passes gate 128 in addition to causing binary counter 118 to clock backwards causes pseudorandom generator comprising the exclusive OR circuit 114 and register 112 to shift the contents of register 112 backwards a number of times equal to the initial count in counter 118. The outputs from register 112 pass through transformation matrix 122, the outputs of which form the deciphered account number and code name. The account number is stored in register 124 with the code name in register 128. The outputs of register 124 are coupled to comparator 126. The binary coded account number 104 is machine read from the credit card and fed by a bus 121 to comparator 126. If the deciphered account number corresponds to the binary coded account number 104 the output line 123 is raised to a logic "1".

Comparator 130 is identical to the comparator in FIG. 4. A first set of inputs of the comparator 130 are derived from the code signature 102 on the charge slip. A second set of inputs are derived from the alphabet display 100 also on the charge slip. The third set of inputs correspond to the code name stored in register 128 deciphered from the encipherment 106 on the credit card. The comparator 130 operating in a manner previously disclosed compares the deciphered code name with the code signature deciphered in accordance with the alphabet display 100 on the charge slip. If a comparison results, line 125 is raised to logic "1" thus enabling AND gate 132. A logic "1" output from gate 132 indicates that the user of the credit card has authority to use it and that the account number has not been altered.

Thus, if the charge slip is verified, a logic "1" at the output of AND gate 132 may be used to actuate a solenoid to imprint the charge slip with a mark as proof of verification.

In order to help secrecy of the code name, the alphabet display 100 can be printed only on the original copy of the charge slip. The carbon paper separating the various copies of the charge slip can be geometrically shaped so as to exclude the code signature area thereby retaining the alphabet display and code signature on the original copy only. After verification has been completed, the original copy is given to the customer.

Figure 8:
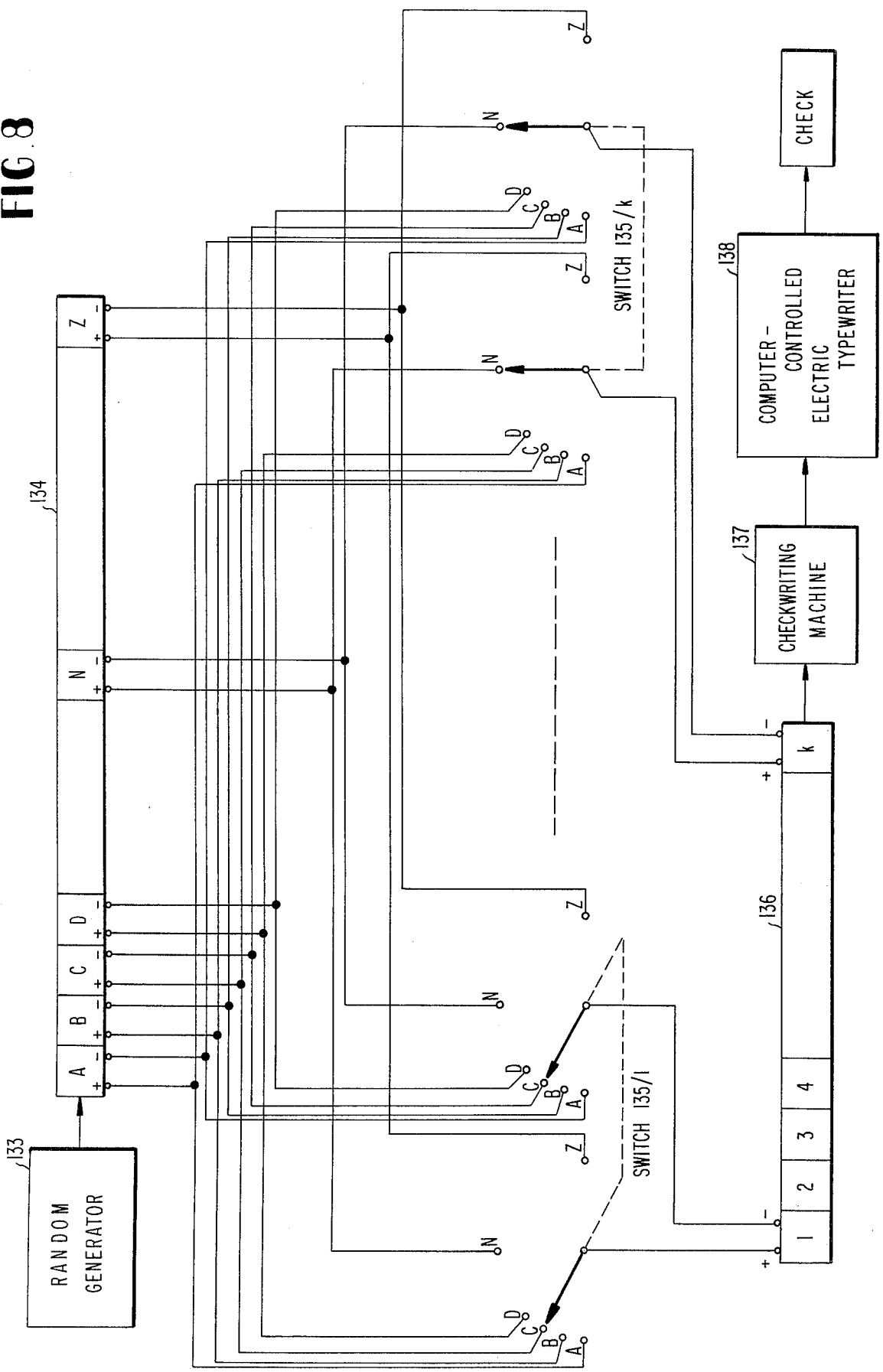
FIG. 8 illustrates a variation of the enciphering apparatus of FIG. 2 applicable to a checkwriting machine.

For the preparation of corporate and government checks by machine, the checkwriting machine rather than a person is assigned a code name. FIG. 8 shows a diagram of a modification of the enciphering system shown in FIG. 2 for a checkwriting machine. Inasmuch as the check has no stub, the machine internally generates a 26-bit random number as the alphabet display. Random number generator 133 loads a 26-bit random number into shift register 134. Each stage of shift register 136 is connected through a 26-position, 2-pole switch 135 to one of the stages of shift register 136. More than one stage of shift register 136 can be connected to any stage of shift register 134. If the machine's code name, for example, is CXFNPULMT . . . N, then the position of switch 135/1 is set at c, the position of switch 135/2 is set at X, the position of switch 135/3 is set at F, and so on until the last switch 135 is set at N. Thus the code signature of the machine appears in shift register 136 based on the random number in shift register 134. This code signature may be typewritten by the check machine's electric typewriter in the clear either in binary form or in alphanumeric form to considerably reduce the number of characters representing the code signature. For example, if the machine has a 24-letter word, the 24-bit code signature could be represented by 4 alphanumeric characters.

The conversion from binary to alphanumeric form can be done by commercial converting devices or by suitably programming the computer controlling the electric typewriter. Alternatively, the binary code signature can be an addition input to transformation matrix 16 and therefore enciphered along with the outer information fed into transformation matrix 16. The remainder of FIG. 2 is built into the checkwriting machine. However, in either case, instead of a printer there is an electric typewriter; and instead of printing the encipherment in the rectangular array shown in FIG. 2, the encipherment is typewritten in a row of binary or alphanumeric characters on the face of the check.

The system of this invention can also be used to verify the authority of the issuer of an airline ticket or any other similar document. An airline ticket is essentially a special check issued by a ticket agent to pay for passage. The tickets would be prepared as for personal checks with a "stub", and the ticket agent would code sign his code name according to the alphabet dislay (1 in FIG. 1) on the "stub". The code name and the agent's identification number would be included in the encipherment.

The system of this invention can also be used to verify the identity of an individual carrying an indentification card similar to the credit card shown in FIG. 5. A signature card, containing only an alphabet display 100 and code signature 102, would be used, similarly to the charge slip in FIG. 6. This procedure would enable an individual to verify his identity based on his unique knowledge of his code name without being required to operate a device or to have a device operate on him. All that he need do is code sign the signature card. The identification card and signature card are then used together in the same manner as are the credit card and charge slip, respectively, in FIG. 7.

The system of this invention can also be used in the securities brokerage business to enable a customer to place his order by mail thereby eliminating the registered representative's commission. Each customer would be issued a set of vouchers, which are essentially special checks. The customers would enter his buy or sell order on the voucher, and code sign according to the alphabet display 1 on the check stub (see FIG. 1). Encipherment 3 would include his code name and account number. The voucher would be machine read by the securities broker's device (FIG. 3), and the broker would be able to verify the identity of the customer placing the order, thereby satisfying the legal requirement that the broker (directly or through the registered representative) must "know his customer" when an order is placed. Thus, the system of this invention enables the broker to know his customer through the mail, and the legal requirement would be satisfield.

The system of this invention can also be used to verify the identity of the endorser of a check or the assignor of a stock certificate. As in the case of the code signature of the maker of a check, the endorsement may be by manual code signature or machine code signature.

Figure 9:
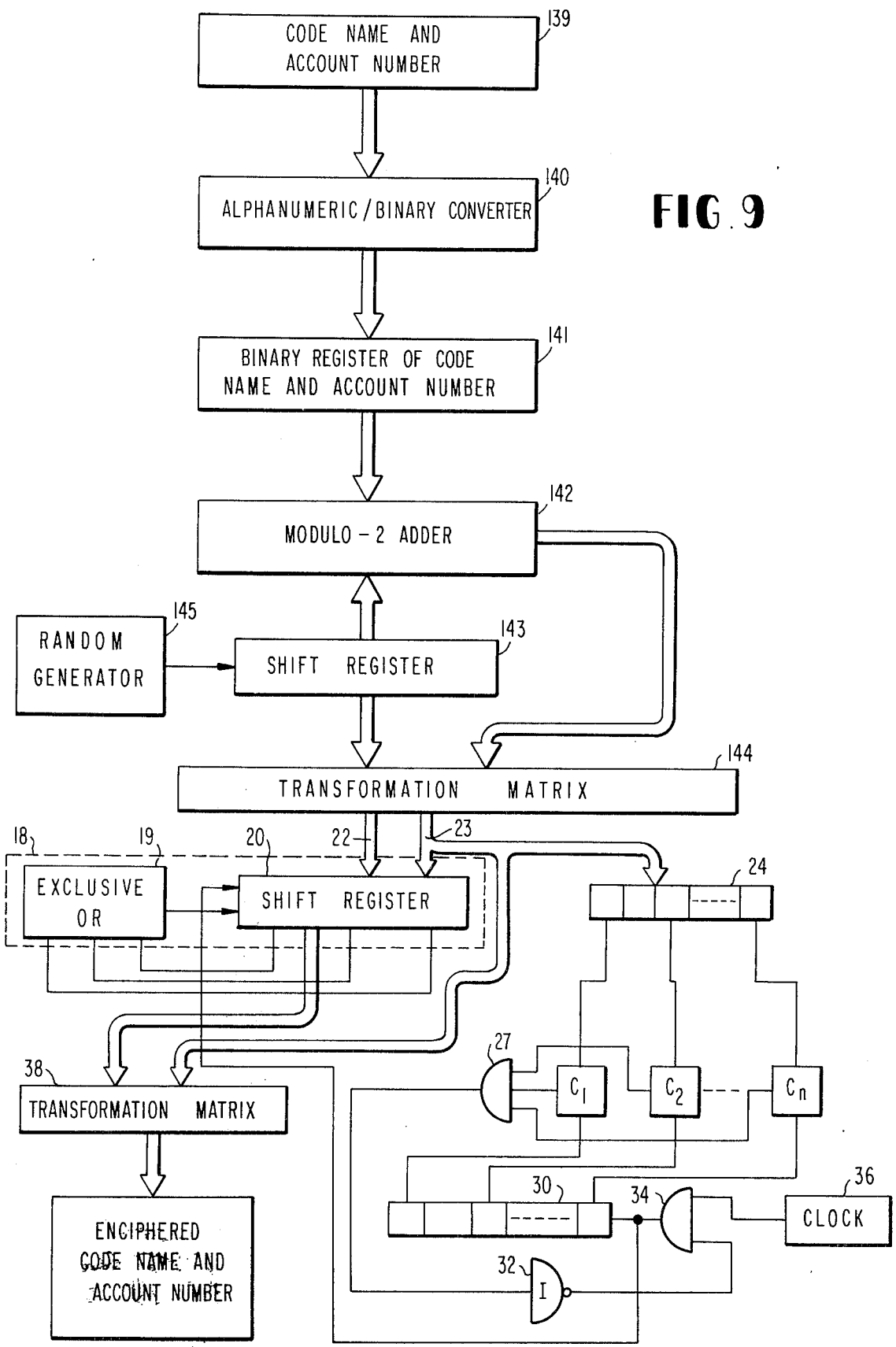
FIG. 9 illustrates a variation of the enciphering apparatus of FIG. 2 applicable to either check endorsement or stock certificate assignment verification systems.

From a practical point of view, each account holder (whether individual, group, corporate or government) would have only one code name for all his accounts. This code name would be established by any one account. The code name would have an enciphered form generated as follows. As illustrated in FIG. 9 the encipherment also includes the account holder's universal account number (e.g. social security number of employer's tax number) if such a universal account numbering system is adopted. Otherwise, the code name and account number are separately enciphered. The actual encipherment would be generated by a machine located at the bank, brokerage or other organization issuing the account. If a new account holder already has been issued a code name under a different account with another organization, he need inform the new organization only of his enciphered code name.

The code name (together with the universal account number if appropriate) is inserted in register 139 shown in FIG. 9. This insertion may be by keyboard. The code name is converted into binary form by alphanumeric/binary converter 140 and entered into binary register 141. Shift register 143 has received a binary random number from random generator 145. The contents of 141 and 143 are modulo-2 added by modulo-2 adder 143, and both the modulo-2 addition and the random number of shift register 43 are transformed by matrix 144 and parallel-inputted into the shift register of a pseudorandom sequence generator. The remainder of the operation is similar to that shown in FIG. 2. The printout of the enciphered code name is made in alphanumeric form; the enciphered code name is suitably recorded for the files of the issuing organization and the customer is provided with a copy of this record.

The enciphered code name of the owner is typewritten on the face of all stock certificates, and of the payee on the face of all checks. The enciphered code name may be located, for example, in parentheses after the actual name.

FIG. 10 shows the assignment form on the reverse side of the stock certificate or on a separate stock power form. The alphabet display 150 at the top is imprinted at random when the certificate is originally printed or by insertion into a kind of device similar to the one shown in FIG. 2. Also, the squares 151 below the manual signature line for the code signature are printed on the certificate when originally printed or rubber stamped on an existing certificate or stock power when the certificate is to be assigned. The alphabet display 150, enciphered code name 152 and code signature 151, can be machine read and/or inserted into the verification device by key-board. If the enciphered code name is in alphanumeric form as above described, then a form of OCR device would be used. The code signature, enciphered code name and alphabet display are all processed as shown in FIG. 7, wherein the assignment form is the "charge slip" containing the alphabet display and code signature, and wherein the face of the certificate is the "credit card" containing the enciphered code name.

The procedure for the verification of the code signature of an assignor is therefore as follows:

1. The certificate margin or separate stock power is either pre-printed with a random alphabet display, or the certificate or form is inserted by the securities broker/dealer employee or bank employee (the latter in the case of a collateral loan) into the verifier to be stamped by the verifier with a random display of the alphabet. Alternatively, for the case of a separate assignment form executed by the assignor without the presence of a broker/dealer employee or bank employee, a random display is pre-printed on the separate form. The display is read by the verifier when the code signature is to be verified.

2. The customer signs his private code signature.

3. The code signature is entered into verifier by the broker/dealer employee or bank employee (outside the presence of the customer if desired for customer relations).

4. The alphanumeric-coded encipherment of the assignor's private account number or code name is entered into the verifier by the broker/dealer employee or bank employee (outside the presence of the customer if desired for customer relations).

5. The verifier compares the random alphabet display, private code name and the code signature.

6. The alphanumeric-coded encipherment of assignee's private name is entered on the assignment in the space provided, in the same manner as the Social Security number of the assignee is entered in the space provided for it.

7. The alphanumeric-coded binary encipherment of the new owner's private name is typewritten by the transfer agent in parentheses following his name on the face of the new securities certificate.

A check is negotiated by the payee by depositing it in his bank account, or by cashing the check at the teller's counter following the manual signature of the payee as part of his endorsement on the reverse side of the check. If the check is deposited, the code signature is ordinarily not required just as the manual signature is ordinarily not required inasmuch as the check will be credited to the account of the payee only if the bank on which the check is drawn verifies the code signature of the payor. If the check is being cashed by the payee, then it would be desirable to verify the signature of the payee on the endorsement. Even if the check is being deposited, it may be desirable to verify the identity of the payee in which case a code signature of the payee would be required on the reverse side of the check.

The reverse side of the check is considered by the system to be similar to the assignment form for a stock certificate. The random alphabet display is either printed in advance when the check blank is printed, or imprinted by the teller's machine which locally generates a random 26bit number. The code signature spaces are either printed in advance when the check blank is printed, or imprinted by the teller's machine or rubber-stamped by the teller. The enciphered code name of the payee and the reverse side of the check are read similarly to the credit card charge slip of FIG. 6; or the alphabet display, code signature and/or enciphered code name are entered by keyboard.

While the invention has been particularly shown and described with reference to various preferred embodiments thereof, it will be understood by those skilled in the art that numerous changes in form and detail may be made therein without departing from the spirit and scope of the invention as defined in the appended claims.

I claim as my invention:

1. In a verification system for verifying the authority of an individual executing a document as well as the authenticity of said document, each authorized individual being identified by a unique code name, each document having designated marking areas for receiving a code signature, said code signature corresponding to said code name formed in accordance with a randomly generated alphabet display, said code name and alphabet display being termed indicators of authority, said system including means for enciphering one of said indicators of authority and an indicator of authenticity, and means for forming on said document said encipherment and said indicator of authenticity in deciphered form, a verifier comprising:

means for reading said encipherment and indicator of authenticity from said document,
   means for deciphering said encipherment to recover said indicator of authenticity and said one of said indicators of authority,
   means for producing the other indicator of authority,
   means for comparing said recovered indicator of authenticity with said indicator of authenticity read from said document, and
   means for comparing said recovered indicator of authority with said code signature and said other indicator of authority to determine if the code signature corresponds to said code name formed as a code signature using the generated alphabet display.

2. The verifier of claim 1 wherein said deciphering means includes:
   reading means for reading said encipherment from said document,
   first register means for storing the read encipherment,
   decipher counter means, responsive to said encipherment, for generating a count equal to the initial count in said encipher counter means,
   decipher pulse producing means, responsive to said decipher counter means, for shifting the contents of said first register means in a second direction an amount equal to the count generated in said decipher counter means, and
   second and third register means coupled to said first register means for respectively storing the contents of said first register means corresponding to said one of said indicators of authority and said indicator of authenticity.

3. The verifier of claim 2, wherein said document is a check and said indicator of authenticity is the check number, said verifier further includes,
   storage means for storing said code name, account number and the check numbers of checks previously paid on the account, said code name being said other indicator of authority, and
   a comparator for comparing the number of the check with the numbers of the checks previously paid.

4. A verification system which verifies the authority of a user of a charge account as well as the authenticity of a charge card, each authorized user being identified by a code name comprising;
   a charge card having formed thereon an encipherment of a code name, uniquely associated with a charge account, and the account number,
   a credit slip exhibiting a randomly generated alphabet display and marking areas for receiving a code signature, said code signature being formed from said code name in accordance with said alphabet display, and
   verification means including means for deciphering said encipherment of said code name and account number and means, responsive to said alphabet display, said code signature and said code name for determining if the code name represented by the code signature corresponds to the code name assigned to said account number.

5. A verification system for verifying the authority of a person executing a document as well as the authenticity of said document, each authorized person being identified by a unique code name, each document having designated marking areas for receiving a code signature, said code signature corresponding to said code name formed in accordance with a randomly generated alphabet display, said code name and alphabet display being termed indicators of authority, said document further comprising an indicator of authenticity and an indicator of authority in enciphered form and an indicator of authenticity in unenciphered form, said system comprising:
   means for reading said indicators in enciphered and unenciphered form and said code signature from said document,
   means for deciphering said enciphered indicators,
   means responsive to said alphabet display, code signature and code name for verifying that the code signature deciphered in accordance with the alphabet display corresponds to the code name, and
   means for comparing said deciphered indicator of authenticity with said unenciphered indicator to determine correspondence.

6. The verification system of claim 5, wherein said system includes storage means for storing said code name.

7. The verification system of claim 5, wherein said certificate is a check, the enciphered indicator of authority is the alphabet display and the enciphered indicator of authenticity is the check number.

8. The verification system of claim 7 wherein said storage means further stores the numbers of all checks previously paid against the account and said comparing means includes means for determining if the check being verified has been previously paid.

9. The verification system of claim 5 wherein said certificate is a charge slip, said enciphered indicator of authority is said code name and said enciphered indicator of authenticity is the account number and wherein said means for verifying includes means for comparing said deciphered code name with the code signature deciphered in accordance with said alphabet display.

10. In a verification system for verifying the authority of a person executing a document, said document including a code signature corresponding to a code name formed in accordance with a randomly generated alphabet display, said code name and said alphabet display being termed indicators of authority, and an encipherment of one of said indicators of authority, a decipherment device comprising;

means for deciphering said encipherment from said document, and means responsive to said code signature and said deciphered encipherment for comparing said code name with said code signature to determine correspondence between the code name and the code signature to determine correspondence between the code name and the code name represented by the code signature.

11. The decipherment device of claim 10 wherein said document further includes document identifying numbers in unenciphered and enciphered form, further including means for deciphering the enciphered document identifying number and means for comparing the unenciphered and deciphered identifying numbers.

12. A method for automatically verifying the authority of a person executing a document comprising the steps of:
    a. assigning to persons having authority a unique code name,
    b. providing a randomly generated alphabet display comprising a randomly generated mark or space for each letter of the alphabet,
    c. recording on said document a code signature comprising a series of marks and spaces corresponding to said code name as determined by said alphabet display, said code name and alphabet display forming indicators of authority,
    d. reading said code signature from said document, and
    e. electronically comparing the code name with the code signature and the alphabet display to determine correspondence between the code name and the code name represented by the code signature.

13. The method of claim 12 further comprising the steps of:
    a. designating each document with a numerical designator,
    b. recording said numerical designator on the document in unenciphered numerical form,
    c. enciphering said numerical designator,
    d. recording the enciphered numerical designator on the document,
    e. machine reading the enciphered numerical designator,
    f. deciphering the enciphered numerical designator, and
    g. electronically comparing the deciphered numerical designator with the unenciphered numerical designator.

14. The method of claim 12 further including the steps of enciphering an indicator of authority and recording said encipherment on said document, and subsequently deciphering said indicator of authority.

15. The method of claim 14 wherein said indicator of authority is said alphabet display, said step of electronically comparing comprising the steps of forming a replica of said code signature from the code name and deciphered alphabet display and comparing the replica of the code signature with the code signature on the document.

16. The method of claim 14 wherein said indicator of authority is the code name assigned to the person having authority to execute the document said step of electronically comparing including the step of forming a replica of said code signature from said deciphered code name and comparing the replica of the code signature on the document.

17. A method for automatically verifying the authority of a credit card user, the card being associated with a credit account comprising the steps of:
    assigning to each account a unique code name; enciphering said code name; recording said encipherment on said credit card; providing a randomly generated alphabet display comprising a randomly generated mark or space for each letter of the alphabet;
    recording on a charge slip a code signature comprising a series of marks and spaces corresponding to said code name as determined by said alphabet display;
    machine reading said encipherment, said alphabet display and said code signature from said charge slip and credit card;
    deciphering said enciphered code name,
    electronically comparing said code signature, said alphabet display and said code name to determine correspondence between said code name and the code name represented by said code signature, 18. The method of claim 17 further including the steps of:
    designating each credit account with a unique account number,
    enciphering said account number,
    recording said encipherment of the account number on the credit card,
    recording said account number is unenciphered form on said credit card,
    reading said enciphered and unenciphered account number,
    deciphering said encipherment of the account number,
    comparing the deciphered account number with the unenciphered account number, and
    providing an acceptance signal when the deciphered account number corresponds with the unenciphered account number and the code name represented by the code signature coincides with the deciphered code name.

19. A method for automatically verifying the authority of a person executing a check, comprising the steps of:
    assigning to each authorized person a code name,
    electronically generating a random alphabet display comprised of a randomly generated mark or space for each letter of the alphabet,
    recording on said check a code signature comprising a series of marks and spaces corresponding to the code name as determined by said alphabet display,
    enciphering said alphabet display and recording said enciphered display on said check,
    machine reading said enciphered display and code signature from said check,
    deciphering said alphabet display and electronically comparing the code signature, deciphered alphabet display and the code name of the person having authority to execute the check.

20. A personal verification system for verifying the authority of an individual executing a document as well as the authenticity of said document wherein each authorized individual is identified by a unique code name each said document comprising a randomly generated alphabet display consisting of random marks and spaces corresponding on a one-to-one basis with the letters of the alphabet, designated marking areas for receiving a code signature which is formed by either marking in or leaving blank areas corresponding to each letter of the code name in accordance with the marks and spaces of said randomly generated alphabet display thereby causing the code signature to vary randomly from document to document, and an account identification display identifying the account of a specific authorized individual, said verification system comprising document reading means for sensing on an executed document each of said randomly generated alphabet display, said code signature and said account identification display and providing respective outputs indicative thereof, code name generating means responsive to the account identification output of said document reading means for generating an output corresponding to the code name of the authorized individual to whom the account is assigned, means connected to said document reader means and said code name generating means for producing an output corresponding to the correct encoding of the code name assigned to the identified account based on the randomly generated alphabet display on the specific document being read by said document reading means, and means for comparing the code signature sensed by said document reading means with the correct encoding of the code name produced by said last mentioned means and providing an output indicating the authority of the individual that executed the document and the authenticity of the document.

* * * * *